(12) United States Patent
Muramatsu

(10) Patent No.: US 7,353,925 B2
(45) Date of Patent: Apr. 8, 2008

(54) ROTATION-RESPONSIVE TYPE ONE-WAY CLUTCH

(75) Inventor: Kazuhiko Muramatsu, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 199 days.

(21) Appl. No.: 11/168,873

(22) Filed: Jun. 29, 2005

(65) Prior Publication Data
US 2006/0000683 A1   Jan. 5, 2006

(30) Foreign Application Priority Data
Jun. 30, 2004   (JP) .............................. 2004-193854

(51) Int. Cl.
*F16D 41/066*   (2006.01)
(52) U.S. Cl. .................. 192/45; 192/105 BA
(58) Field of Classification Search ...................... None
See application file for complete search history.

(56) References Cited

U.S. PATENT DOCUMENTS 1,820,151 A  *  8/1931  Mullen  .......................... 192/45
4,415,072 A  *  11/1983  Shoji et al.  ..................... 192/45
2005/0034951 A1 *  2/2005  Takasu  ......................... 192/45

FOREIGN PATENT DOCUMENTS

| JP | 52-010045 | | 1/1977 |
| JP | 53-8019 | | 3/1978 |
| JP | 2004-316885 A | | 11/2004 |
| JP | 2004-316886 A | | 11/2004 |
| JP | 2004-316887 A | | 11/2004 |
| JP | 2004-316888 A | | 11/2004 |
| JP | 2004-316889 A | | 11/2004 |
| JP | 2004-316890 A | * | 11/2004 |
| JP | 2004-316891 A | | 11/2004 |

\* cited by examiner

*Primary Examiner*—Rodney H. Bonck
(74) *Attorney, Agent, or Firm*—Miles & Stockbridge P.C.

(57) ABSTRACT

A rotation-responsive type one-way clutch comprises an outer race having a cylindrical inner peripheral surface, an inner race having a cam surface, a rolling element for transmitting a torque between the outer and inner races, an urging spring for urging the rolling element, a weight member adapted to be exerted thereto with a centrifugal force, for pressing the rolling element in an engaging direction while overcoming an urging force of the urging spring, and a guide structure for preventing the urging spring from displacing radially outward.

8 Claims, 3 Drawing Sheets

ROTATION-RESPONSIVE TYPE ONE-WAY CLUTCH

BACKGROUND OF THE INVENTION

1. Field of the Invention

The present invention relates to a rotation-responsive type one-way clutch which is used in a motor-cycle, a snow mobile or the like, and which exhibits a one-way clutch function when a rotational speed becomes not less than a predetermined speed.

2. Description of the Related Art

In general, a one-way clutch is composed of an outer race and an inner race which are rotated relative to each other, a sprag or a roller for transmitting a torque between the outer race and the inner race, which is adapted to be engaged with a cam surface formed on a raceway surface of the inner race or the outer race so as to transmit a torque in only one direction. Incidentally, this clutch slips in the other direction.

Further, in the above-mentioned embodiments, although it has been explained that the pockets are formed at several circumferential positions, the number of the pockets may be optionally changed, depending upon a required torque capacity. However, it is preferable to provide the pockets at equal circumferential pitches, irrespective of the number thereof. Although it has been explained that the urging spring 5 is fixed to the bent portions 18 of the side plates 10, a cage for holding the urging spring 5 may be provided so as to fix the urging spring 5 to the cage.

For example, Japanese Patent Publication No. S53-8019 discloses such a configuration that a roller is set in a recess formed in an outer race, and when the outer race is rotated clockwise, the roller is locked in the recess under a wedging action, and accordingly the rotation of the outer race is locked, relative to an inner race.

Further, Japanese Patent Laid-Open No. S52-100045 discloses such a configuration that a roller and an auxiliary roller are arranged between an outer race and an input coupling. With this configuration, the auxiliary roller presses the roller under a centrifugal force at a rotational speed not less than a predetermined value by a pressing force by which the roller can be locked under a wedging action with rotation in a predetermined direction. Thus, a one-way clutch function can be exhibited.

The one-way clutch disclosed in the Japanese Patent Publication No. S53-8019 is a typical conventional one using a roller, which is not the one which can be locked in response to a rotational speed.

Further, the Japanese Patent Laid-open No. S52-100045 discloses the one which is locked in response to a rotational speed. However, since an elongated hole which defines an operating range of the auxiliary roller is formed in a component other than the inner race, it is difficult to obtain a desired dimensional accuracy for the one-way clutch, and the necessary number of components becomes larger. Further, there would be such a risk that the auxiliary roller is caught in the elongated hole. Thus, parts such as a plate and an cantilever piece are required while a space for accommodating therein a spring is also required, and accordingly, it is limited to decrease the diameter of the one-way clutch.

In order to solve the above-mentioned problems, as disclosed in Japanese Patent Application No. 2003-101480, there may be provided such a configuration that an urging spring is fitted in a recess in the inner race so as to urge the roller. However, even with this configuration, there would be caused such a risk that the urging spring displaces during operation, diametrically outward, that is, toward the outer race, and then comes off.

SUMMARY OF THE INVENTION

In order to solve the above-mentioned problems, an object of the present invention is to provide a rotation-responsive type one-way clutch which can reduce the number of necessary components, which is inexpensive, and which can decrease a spring constant, which can easily obtain dimensional accuracy, which can prevent a weight member from being caught, which can be stably operated without an urging spring displacing diametrically outward, and which has a configuration that can be designed in a space saving manner.

To the end, according to the present invention, there is provided a rotation-responsive type one-way clutch comprising an outer race having an inner cylindrical peripheral surface, an inner race formed therein with a cam surface, a rolling element for transmitting a toque between the inner and outer races, an urging spring for urging the rolling element, and a weight member for pressing the rolling element in an engaging direction, overcoming an urging force of the urging spring when a centrifugal force is exerted thereto, wherein a guide means for preventing the urging spring from displacing diametrically outward is provided.

The present invention can offer advantages as follows:

With the provision of the guide means for preventing the urging spring from displacing diametrically outward, there can be provided a rotation-responsive type one-clutch which can reduce the number of necessary components, which is inexpensive, which can easily obtain dimensional accuracy, which can prevent a weight member from being caught, which can be stably operated without the urging spring from displacing diametrically outward, and which has such a configuration that a rotation-responsive type one way clutch can be designed in a space saving manner.

It is noted that the wording "rotation-responsive type" stated throughout the specification gives such meaning that a one-way clutch function is surely exhibited at a rotational speed exceeding a predetermined value. However, there would be such a case that the one-way clutch function may be exhibited at a rotational speed in a low speed range, which is not greater than the predetermined value. Further, the predetermined value can be optionally set in view of a mass of the weight member, a distance between the weight member and the center of the inner race, and an inclined angle of an operating surface of the weight member.

DESCRIPTION OF THE PREFERRED EMBODIMENTS

Figure 1A:
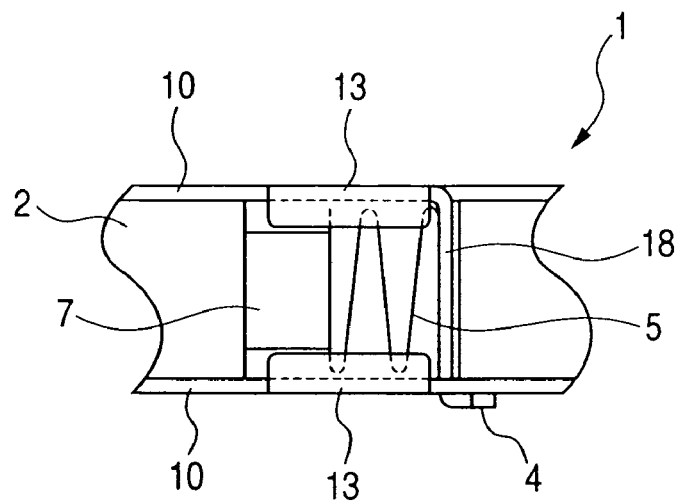
FIGS. 1A and 1B are a partial top view and a partly broken front view illustrating a rotation-responsive type one-way clutch in an embodiment of the present invention, which is in a set condition before operation (rotation) thereof.

Explanation will be hereinbelow made of embodiments of the present invention with reference to the accompanying drawings in which like reference numeral denotes like parts.

Figure 1B:
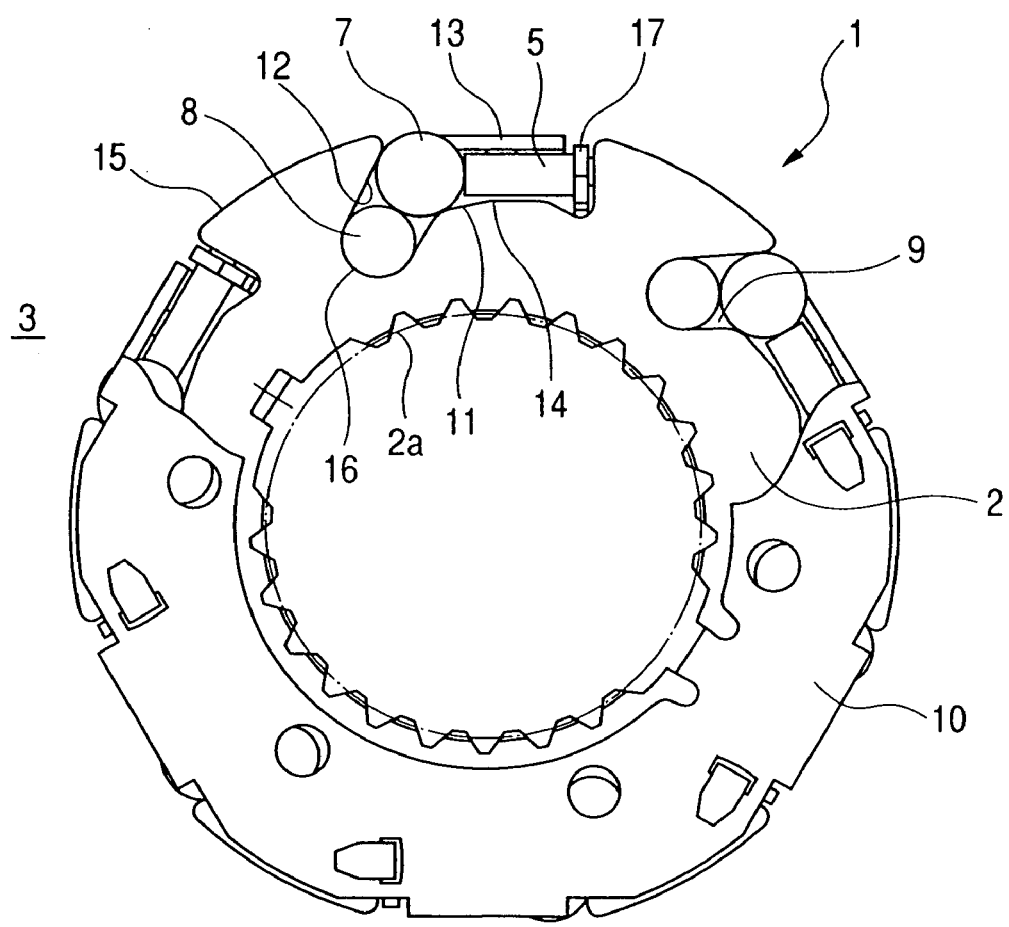

FIGS. 1A and 1B are a partial top view and a partly broken front view illustrating a rotation-responsive type one-way clutch (which will be hereinbelow sometimes referred to as "one-way clutch" for the sake of convenience in explanation) in an embodiment of the present invention in an disengaged condition in which the one-way clutch 1 slips.

Referring to FIG. 1B, the one-way clutch 1 is composed of an inner race 2 having an inner peripheral surface in which splines 2a are formed and serving as a hollow shaft fitted on a drive shaft (which is not shown), and an outer race 3 which is arranged radially outward from and concentric with the inner race 2, and which is rotatable, relative to the inner race 2. The inner race 2 has an outer peripheral portion formed therein with a plurality of pockets 9 which are opened to the inner peripheral surface of the outer race 3 and which are arranged at equal circumferential pitches. The outer peripheral surface of the inner race 2 between the pockets 9 serves as bearing portions 15 which are made into slidable contact with the inner peripheral surface of the outer race 3.

Each pocket 9 is formed in a part of the inner peripheral surface thereof with a cam surface 11, and receives therein a substantially cylindrical roller 7 and a substantially cylindrical weight member 8 which are rolling elements for transmitting a torque. The pocket 9 is also provided therein with an urging spring 5 which urges the roller 7 in a disengaging direction, that is, depthwise of the cam surface 11, so that the roller 7 is not engaged between the cam surface 11 and the cylindrical inner peripheral surface of the outer race 3, resulting in slipping of the one-way clutch 1.

Further, the inner race 2 is formed therein with a non-wedge acting surface 14 diametrically outward from the cam surface 11, on the side remote from the weight member 8, having an inclination which is set to be greater than that of the cam surface 11. The non-wedge acting surface 14 is shallower than the cam surface 11, that is, it has an inclination which is set to be larger than that of the cam surface 11. When an excessive torque is exerted to the roller 7, the roller 7 displaces to the non-wedge acting surface 14 so as to relieve this excessive toque on this non-wedge acting surface 14 in order to prevent damage of the one-way clutch.

The weight member 8 is accommodated in a recess 16 formed in the inward portion of the pocket 9, and the roller 7 is set on the weight member 8. A cut-out in the bearing portion 18 of the inner race, near the weight member 8, is formed therein with a weight acting surface 12 for guiding the weight member 8 when the weight member 8 is displaced by a centrifugal force.

As the urging spring 5, there is used an accordion spring formed of a bent planar member. Bent parts 18 of side plates 10 which will be explained later is clamped by an attaching part of the urging spring 10 which is therefore held by the side plates 10. Further, the urging spring 5 can be fixed with its one end portion being wound on the bent portions 18. The urging spring 5 presses the roller 7 at its one end on the side remote from the attaching portion 17.

Further, other than the accordion spring, a coil spring having an elliptic cross-sectional shape can be preferably used as the urging spring 5 in order to prevent the roller 7 from skewing.

As shown in FIG. 1A, each of substantially annular side plates 10 which hold the main portion of the one-way clutch 1 in the axial direction thereof, is formed therein with a plurality of flange portions 13 extending axially inward. The flange portions 13 are arranged at circumferentially equal pitches, corresponding to the pockets 9. Further, bent portions 18 are formed, being extended axially, adjacent to the flange portions 13, and having their distal ends calked so as to serve as clamping portions 4.

Each clamping portion 4 is fitted in a hole (which is not shown) formed in the other side plate 10, and in this condition, is bent back. Thus, the side plates 10 are fixed together. It is noted that the side plate 10 on the rear side is not shown in FIG. 1B but the side plate 10 on the front side is not shown in FIG. 2B which will be described later.

Figure 2A:
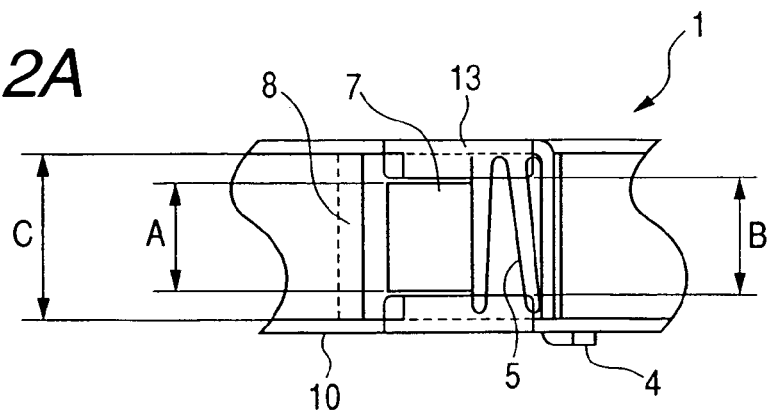
FIGS. 2A and 2B are a partial top view and a partial front view illustrating the rotation-responsive type one-way clutch in the embodiment of the present invention, which is in an engaged condition.

As shown in FIG. 2A, the roller 7 has an axially width A which is shorter than a minimum width B between the flange portions 13 of the side plates 10. Thus, it can be projected radially outward between the flange portions 13. Further, the weight. portion 8 has an axially width C which may be substantially equal to the axial width of the inner race 2.

Similarly, the axial width of the urging spring 5 which is the accordion spring, is set to be larger than the width between the flange portions 13. Accordingly, since both axial ends of urging spring 5 are held by the flange portions 13 of the side plates 10, the urging spring 5 can be prevented from displacing excessively, radially outward, that is, toward the outer race 3 during operation of the one-way clutch 1.

As clearly understood from FIG. 1B, the diameter of the side plate 10 is set to be slightly smaller than a diameter with which the outer peripheral surface of the inner race 2 is defined. Accordingly, the flange portions 13 are also biased toward the inner diameter side from the outer peripheral surface of the inner race 2, and accordingly, abuts against the inner peripheral surface of the outer race 3 during operation of the one-way clutch 1 so as to prevent occurrence of hindrance to the operation of the one-way clutch 1.

Figure 2B:
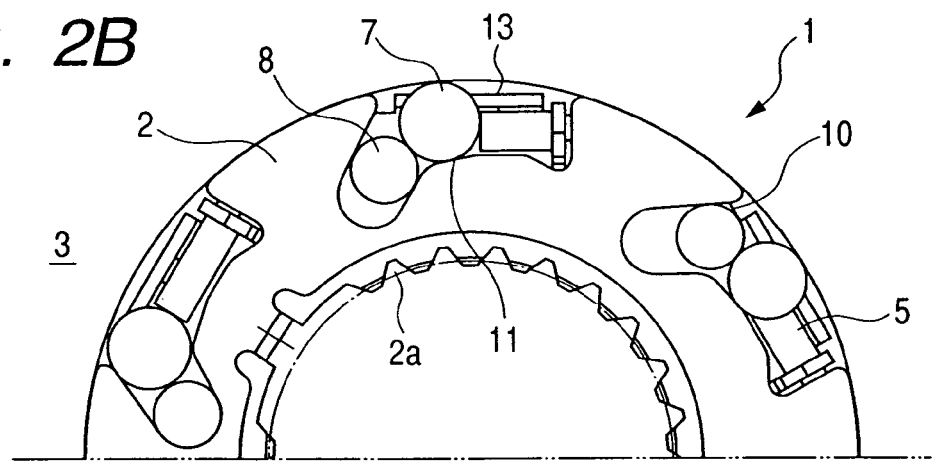

Next, explanation will be hereinbelow made of the operation of the rotation-responsive type one-way clutch in this embodiment with reference to FIGS. 2A and 2B which are a partial top view and a front view in such a condition that the rollers of the one-way clutch are engaged, that is, which show the on-way clutch in an engaged lock up condition.

In the rotation-responsive type one-way clutch having the configuration as stated above, the rollers 7 do not transmit a torque in a range from a non rotation to a low rotational speed, in either of both relative rotating directions of the inner and outer races 2, 3. FIGS. 1A and 1B show this condition, and a slight gap is present between the inner peripheral surface of the outer race 3 and each roller 7. At this time, each weight member 8 is located substantially inwardmost of the pocket 9. The roller 7 is urged and held by the urging spring 5 so as to be made into contact with both weight acting surface 12 formed in part on the surface defining the pocket 9, and cam surface 11, and the weight member 8 is located in a space surrounded by the roller 7, the weight acting surface 12 defining the pocket 9 and the cam surface 11.

When the rotational speed is increased from the non-engaged condition shown in FIGS. 1A and 1B, the weight member 8 is exerted thereto with a centrifugal force, and therefore displaces radially outward along a circumferential end surface which is formed in the side part of the pocket 9, being inclined so as to gradually decrease the circumferential width of the pocket 9, radially outward, that is, along the weight acting surface 12. Thus, the centrifugal force exerted to the weight member 8 is added to a centrifugal force exerted to the roller 7 itself, thus, the roller 7 is applied with a force with which the roller 7 is pressed circumferentially up to a position where it can be engaged with the cam surface 11. FIGS. 2A and 2B show such an engaging condition, and accordingly, the roller 7 is engaged between the inner peripheral surface of the outer race 3 and the cam surface 11.

Further, when the rotational speed exceeds a predetermined value, a condition the roller 7 is applied thereto with a sufficient pressing force, there can be effected a condition in which the rotation-responsive type one-way clutch 1 can exhibit its function, that is, a possible lock-up condition. Namely, in this condition, estimating that the inner race 2 is fixed in FIG. 2A, when the outer race 3 is rotated counterclockwise in the figure, a slipping condition (the disengaging condition as shown in FIG. 1A) is effected, but an engaging condition is effected when it rotated clockwise in the figure so as to transmit a toque between the inner and outer races.

The urging springs 5 are prevented at their ends from abutting against to each other even in the engaging condition. Thus, it is possible to prevent the springs 5 from being fatigue. It is noted that all of the rollers 7 and the weight members 8 are not shown in FIGS. 1A and 1B.

Figure 3:
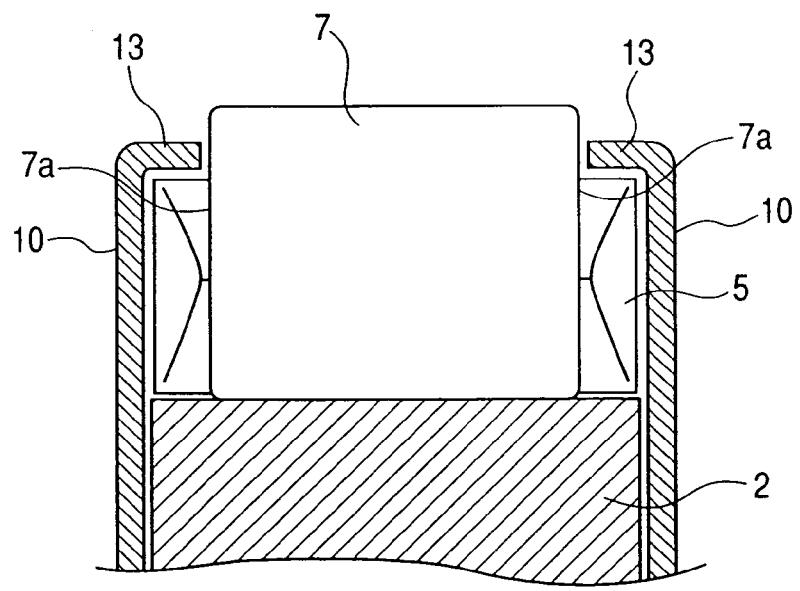
FIG. 3 is an axial sectional view illustrating the rotation-responsive type one-way clutch in the condition shown in FIG. 2.

Next, referring to FIG. 3, explanation will be made of the relationship between the roller 7 and the flange portions 13 of the side plates 10. FIG. 3 is an axially sectional view corresponding to a condition shown in FIGS. 2A and 2B, and shows the one-way clutch 1 which falls in such an engaging condition that the roller 7 is engaged with the inner peripheral surface of the outer race 3. A predetermined gap is defined between the flange portion 13 of each side plate 10 and the associated axially end face 7a of the roller 7, and accordingly, the roller 7 can be projected between the flange portions 13 of the side plates 10 above the upper surfaces of the flange portions 13 with no hindrance. The flange portions 13 are projected from both sides so as to hold only both axial ends of the urging spring 5 in order to prevent the operation of the roller 7 from being hindered. That is, the side plates 10 and the flange portions 13 constitute a guide means.

Further, as clearly understood from FIG. 3, since both axial ends of the urging spring 5 are inhibited by the flange portions 13 from displacing axially outward, the urging spring 5 can be prevented from coming off toward the outer race 3 during operation. That is, the flange portions 13 guide and hold the urging spring 5 for pressing the roller 7 in the disengaging direction, and accordingly, the urging spring 5 can be prevented from coming off (ejecting) under a centrifugal force during operation of the one-way clutch 1.

Figure 4A:
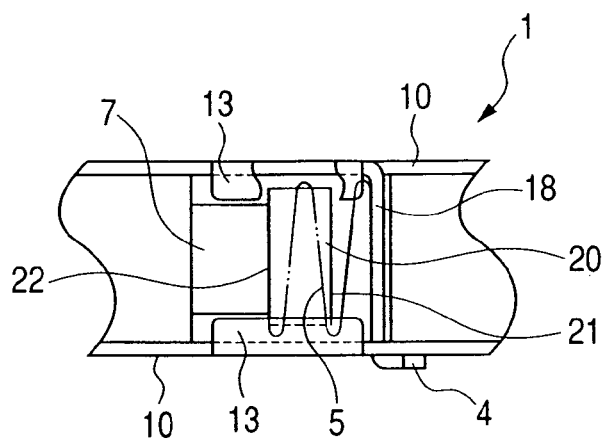
FIGS. 4A and 4B are a partial top view and a partial front view illustrating a rotation-responsive type one-way clutch in a variant form of the embodiment of the present invention.
Figure 4B:
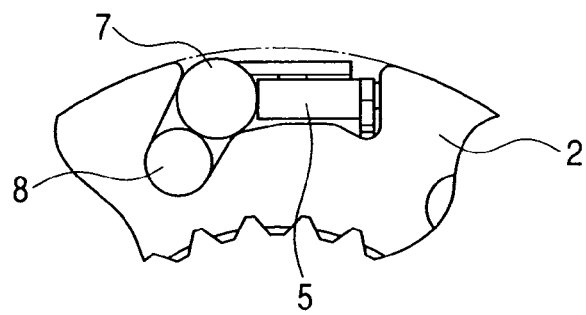
Figure 5A:
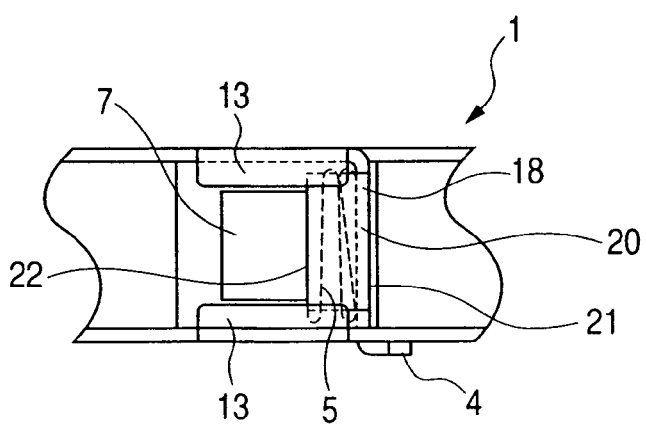
FIGS. 5A and 5B are a partial top view and a partial front view illustrating a rotation-responsive type one-way clutch in a variant form of the embodiment of the present invention.
Figure 5B:
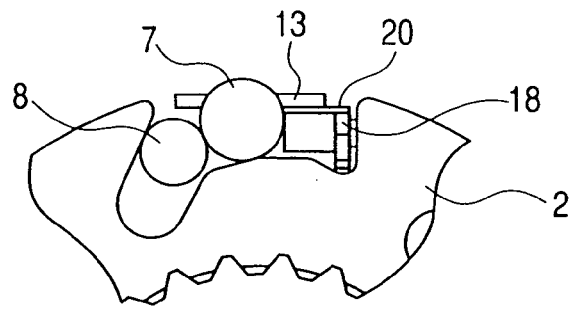

FIGS. 4A and 4B show a rotation-responsive type one-way clutch in a variant form of the embodiment of the present invention in a condition before engagement. FIG. 4A is a partial top view and FIG. 4B is a partial front view. Further, FIGS. 5A and 5B show the rotation-responsive type one-way clutch shown in FIGS. 4A and 4B in an engaging condition. FIG. 5A is a partial top view and FIG. 5B is a partial front view. In this variant form, the shape of the urging spring 5 is different from that in the above-mentioned embodiment. One end of the urging spring 5 is fixed to bent portions 18 of the side plates 10. Further, the free end (the other end) of the urging spring 5 is bent upward so as to form an extension portion 20.

As shown in FIG. 4A, the axial width of the extension portion 20 is set to be larger than the width between the flange portions 13. Thus, axial both ends of the extension portion 20 are always located below the flange portions 13, and accordingly, the urging spring 5 is made into contact with the flange portions 13 and is guided thereby through the extension portion 20. The extension portion 20 and the flange portion 13 are slid on each other, but they can be prevented from hindering their relative displacement against each other. Further, a circumferential end portion 22 of the extension portion 20 defines a sufficient clearance with respect to the roller 7 so as to prevent the operation of the roller 7 from being hindered. Further, it goes without saying that the width of the extension portion 20 can, of course, be optionally set. In stead of the extension portion 20, a separate plate member may be provided between the flange portions 13.

When the extension portion 20 is located between the flange portions 13 of the side plates 10 and the roller is displaced toward its engaging position, the urging spring 5 displaces above the bent portions 18 of the side plates 10, but it can be prevented from being caught. As a result, no friction is caused. With the provision of the extension portion 20, upon actuation of the urging spring 5 under a centrifugal force, it increases its contact area with the flange portions 13 so as to decrease a surface pressure in order to prevent abrasion of the urging spring 5 and the flange portions 13 due to contact therebetween, thereby it is possible to stabilize the actuation of the urging spring 5.

As shown in FIGS. 5A and 5B, when the roller 7 comes into an engaging condition, the urging spring 5 is compressed maximumly, and the distal end portion 21 of the extension portion 20 displaces up to a position just above the bent portions 18 of the side plates 10.

However, the length thereof is set so that it is prevented from abutting against the inner race 2.

As in the variant form, with the provision of the extension portion 20 at the free end of the spring 5, since the surface pressure of the spring 5 against the flange portions 13 of the side plates 10 is received only by the extension portion 20, it is possible to prevent the surface pressure from being increased by the spring 5 which would otherwise directly abut against the flange portions 13 each having a relatively small area. Thus, the actuation of the spring 5 can be stabilized, thereby it is possible to prevent local abrasion.

It is noted that the weight member may be formed from a material such as steel, copper, copper alloy, aluminum or synthetic resin. It may be preferably formed from a material having a large specific weight, such as steel since the centrifugal force in unit area is large. Thus, the size of the one-way clutch can be reduced, and accordingly, it can be engaged even at a low rotational speed, thereby it is possible to decrease the diameter of the weight member 8.

Although explanation has been made in the above-mentioned embodiment of such a configuration that a cylindrical roller is used as the rolling element received in the pocket, a spherical body may also be used. Further, as to the weight member, there may be used a spherical body, instead of the cylindrical roller. As to the combination of the rolling element and the weight member, both may consist of rollers or spherical balls, or a roller and a spherical ball or vise versa.

Further, in the above-mentioned embodiments, although it has been explained that the pockets are formed at several circumferential positions, the number of the pockets may be optionally changed, depending upon a required torque capacity. However, it is preferable to provide the pockets at equal circumferential pitches, irrespective of the number thereof. Although it has been explained that the urging spring 5 is fixed to the bent portions 18 of he side plates 10, a cage for holding the urging spring 5 may be provided so as to fix the urging spring 5 to the cage.

Further, in the above-mentioned embodiments, although explanation has been made of the diameter of the roller which is larger than that of the weight member, it may be optionally set in view of a use condition (for example, a rotational speed range during operation). For example, the diameter of the roller may be set to be equal to that of weight member.

It is noted that the rotation-responsive type one-way clutch according to the present invention can be applied to a four-wheel vehicle and the like, in addition to a motor cycle, a snow mobile and the like.

This application claims priority from Japanese Patent Application No. 2004-193854 filed on Jun. 30, 2004, which is hereby incorporated by reference herein.

What is claimed is:

1. A rotation-responsive one-way clutch comprising an outer race having a cylindrical inner peripheral surface, an inner race formed with a cam surface, a rolling element for transmitting a torque between the inner and outer races, an urging spring for urging the rolling element, and a weight member adapted to be subjected to a centrifugal force for pressing the rolling element in an engaging direction while overcoming an urging force of the urging spring, wherein a guide means for preventing the urging spring from displacing radially outward is provided, and wherein the guide means is provided to side plates arranged in an axial direction of the rotation-responsive one-way clutch, and includes flange portions which are axially extended, facing each other.

2. A rotation-responsive one-way clutch according to claim 1, wherein a space between the flange portions is greater than an axial width of the rolling element.

3. A rotation-responsive one-way clutch according to claim 2, wherein the guide means includes an extension portion of the urging spring.

4. A rotation-responsive one-way clutch according to claim 1, wherein the guide means includes an extension portion of the urging spring.

5. A rotation-responsive one-way clutch comprising an outer race having a cylindrical inner peripheral surface, an inner race formed with a cam surface, a rolling element for transmitting a torque between the inner and outer races, an urging spring for urging the rolling element, a weight member adapted to be subjected to a centrifugal force for pressing the rolling element in an engaging direction while overcoming an urging force of the urging spring, and a pair of side plates disposed at opposite axial sides of the rotation-responsive one-way clutch, each side plate having a guide portion projecting toward the other side plate, said guide portions of the side plates being disposed to prevent the urging spring from displacing radially outwardly.

6. A rotation-responsive one-way clutch according to claim 5, wherein a space between the guide portions is greater than an axial width of the rolling element.

7. A rotation-responsive one-way clutch according to claim 5, wherein the urging spring has an extension portion which cooperates with said guide portions.

8. A rotation-responsive one-way clutch according to claim 5, wherein said guide portions are constituted by flanges of said side plates.

* * * * *